(12) United States Patent
Anastas

(10) Patent No.: US 6,505,812 B1
(45) Date of Patent: Jan. 14, 2003

(54) SOLENOID VALVE

(75) Inventor: Jeffrey V. Anastas, Kennebunk, ME (US)

(73) Assignee: MKS Instruments, Inc., Andover, MA (US)

( * ) Notice: Subject to any disclaimer, the term of this patent is extended or adjusted under 35 U.S.C. 154(b) by 166 days.

(21) Appl. No.: 09/715,890

(22) Filed: Nov. 17, 2000

(51) Int. Cl.$^7$ ............................................. F16K 31/02
(52) U.S. Cl. ........................... 251/129.07; 251/129.15; 251/282; 251/335.3
(58) Field of Search .............. 251/129.07, 129.15, 251/282, 335.3

(56) References Cited

U.S. PATENT DOCUMENTS

| | | | |
|---|---|---|---|
| 2,838,068 A | 6/1958 | Ray | 137/625.33 |
| 2,911,186 A | 11/1959 | Knox | 251/191 |
| 3,010,695 A | 11/1961 | Banks | 251/205 |
| 3,214,134 A | 10/1965 | Noakes | 251/282 |
| 3,441,246 A | 4/1969 | Lauppe et al. | |
| 3,442,485 A | 5/1969 | Reynolds | 251/129 |
| 3,627,257 A | 12/1971 | Stampfli | 251/129 |
| 3,949,964 A | 4/1976 | Freeman | 251/76 |
| 4,796,854 A | 1/1989 | Ewing | 251/129.07 |
| 4,852,853 A | 8/1989 | Toshio et al. | 251/129.07 |
| 5,277,403 A | 1/1994 | Waggott et al. | 251/282 |
| 5,476,245 A | 12/1995 | Augustin | 251/129.02 |
| 5,641,148 A | 6/1997 | Pena et al. | 251/129.07 |
| 5,727,769 A | 3/1998 | Suzuki | 251/129.15 |
| 5,810,030 A | 9/1998 | Uchiyama et al. | 137/468 |
| 5,836,230 A | * 11/1998 | Sturman | 251/129.07 |
| 5,839,661 A | 11/1998 | Iwanaga | 239/88 |
| 5,878,965 A | 3/1999 | Coldren et al. | 239/585.1 |
| 6,045,120 A | 4/2000 | Tarr et al. | 251/282 |
| 6,068,236 A | 5/2000 | Espey | 251/129.07 |

FOREIGN PATENT DOCUMENTS

GB   1109045   4/1968

OTHER PUBLICATIONS

International Search Report dated Dec. 4, 2002.
Type 1640 Pressure–Based Mass–Flo Controller For Ion Implant Applications, Bulletin 1640—4/00, MKS Instruments.
Type 1479A Metal–Sealed Mass–Flo Controller, Bulletin 1479A—5–00, MKS Instruments.

* cited by examiner

Primary Examiner—Henry C. Yuen
Assistant Examiner—John Bastianelli
(74) Attorney, Agent, or Firm—McDermott, Will & Emery

(57) ABSTRACT

A valve assembly including a body having an inlet port, an outlet port, and a valve seat having a passageway. An electrical solenoid assembly moves a valve member upon being energized to control fluid flow between the inlet and the outlet ports. The valve assembly also includes a fluid-tight bellows positioned to apply a force to the valve member, and a pressure balancing passageway connects the inlet port to the bellows. The valve assembly further includes a housing received over the solenoid assembly and having a flange received against the valve body. A seal is positioned between the flange of the housing and the valve body, and a collar is secured in a continuous manner to the valve body over the housing flange, thereby securing the housing to the valve body and applying a sealing force to the seal in a substantially even manner.

20 Claims, 4 Drawing Sheets

SOLENOID VALVE

FIELD OF DISCLOSURE

The present disclosure relates to the field of fluid flow control and, more particularly, to a solenoid valve. Even more particularly, the present disclosure relates to improvements in solenoid-actuated proportional-control valves, and, in one particular aspect, to a unique and advantageous electrically operated fluid valve of low-cost and uncomplicated construction which accurately controls high-volume flows with the aid of a frictionless suspension and a pressure-counterbalancing bellows cooperating with its movable valve member.

BACKGROUND OF DISCLOSURE

Fluid valves exist in a wide variety of forms and sizes, serving a multitude of purposes, handling flowable materials whose characters range from light gaseous to heavy slurries and near-solids, and operable at various speeds under controls as diverse as simple binary (ON-OFF), proportional, direct-manual and remote-electrical. Those which are capable of responding quickly to govern even relatively large flows with precision, and with expenditure of little electrical power, are of special interest in certain industrial processing, such as the automatic regulation of gases in semiconductor and integrated-circuit manufacture. Mass flow controllers, for example, are widely used in the manufacturing to control the delivery of process gases, and the mass flow controllers include such valves.

A problem previously encountered with such valves was adverse effects of line pressures on valve members of the valves at or near closure of the members. Another problem was the large control forces which were needed to overcome friction and valve broad-area flow passages in accommodation of high rates and volumes of flow.

In response to these problems, U.S. Pat. No. 4,796,854 (the '854 patent) provides a proportional-control solenoid-actuated fluid valve, capable of governing relatively large volumes and rates of flow swiftly and accurately with expenditure of relatively little electrical power. The disclosed valve includes a movable valve member positioned by an armature having a substantially frictionless spring suspension, the armature being under influence of a special force-counterbalancer in the form of a bellows proportioned and disposed to exert upon it, automatically, neutralizing forces which are substantially equal and opposite to unavoidable pressure-induced imbalances afflicting the valve member. The same pressures which tend to unbalance the valve member are impressed upon opposite sides of the bellows, one through an enabling bleed port, and resulting forces developed by the bellows over a defined area are exerted upon the armature mechanically in a counterbalancing sense.

Other examples of more refined valve assemblies can be found in the Type 1479 and Type 1640 mass flow controllers available from MKS Instruments, Inc. of Andover, MA.

The previously existing designs, accordingly, provide excellent proportional-control solenoid-type valves which can swiftly and accurately govern even relatively large volumes and high rates of fluid flow using relatively low levels of electrical power, since the valves are aided by the force counterbalancing achieved through the use of the bellows-type coupling. The previously existing valve assemblies also provide sensitive and precise valving by way of the frictionless suspension of broad-area valve members and the counterbalancing of undesirable pressure-generated forces through a correlated pressure-responsive coupling.

What is still desired, however, is a valve assembly providing all the benefits of these previous valve assemblies, yet which has a simpler design including fewer components.

SUMMARY OF DISCLOSURE

The present disclosure, accordingly, provides a valve assembly including a body having an inlet port, an outlet port, and a valve seat having a passageway connecting the inlet and the outlet ports. A valve member is movable along an axis extending through the passageway of the valve seat to close and open the passageway, and an electrical solenoid assembly moves the valve member upon being energized to control fluid flow between the inlet and the outlet ports.

The valve assembly also includes a fluid-tight bellows positioned within the body to apply a force to the valve member in opposition to a force applied to the valve member by the fluid flow between the inlet and the outlet ports. A pressure balancing passageway connects the inlet port to the bellows.

The valve assembly further includes a housing received over the solenoid assembly and having a flange received against the valve body. A seal is positioned between the flange of the housing and the valve body, and a collar is secured in a continuous manner to the valve body over the housing flange, thereby securing the housing to the valve body and applying a sealing force to the seal in a substantially even manner.

The valve assembly according to the present disclosure provides all the benefits of prior existing valve assemblies, yet has a simpler design including fewer components that are easier to assembly together during manufacturing.

These and other features and benefits of the present disclosure will become more apparent upon reading the following detailed description in combination with the accompanying drawings.

BRIEF DESCRIPTION OF DRAWINGS

The foregoing and other features and advantages of this disclosure will be better understood from the detailed description and the drawings, in which.

Like reference characters designate identical or corresponding components and units throughout the several views.

DETAILED DESCRIPTION OF DISCLOSURE

Figure 1:
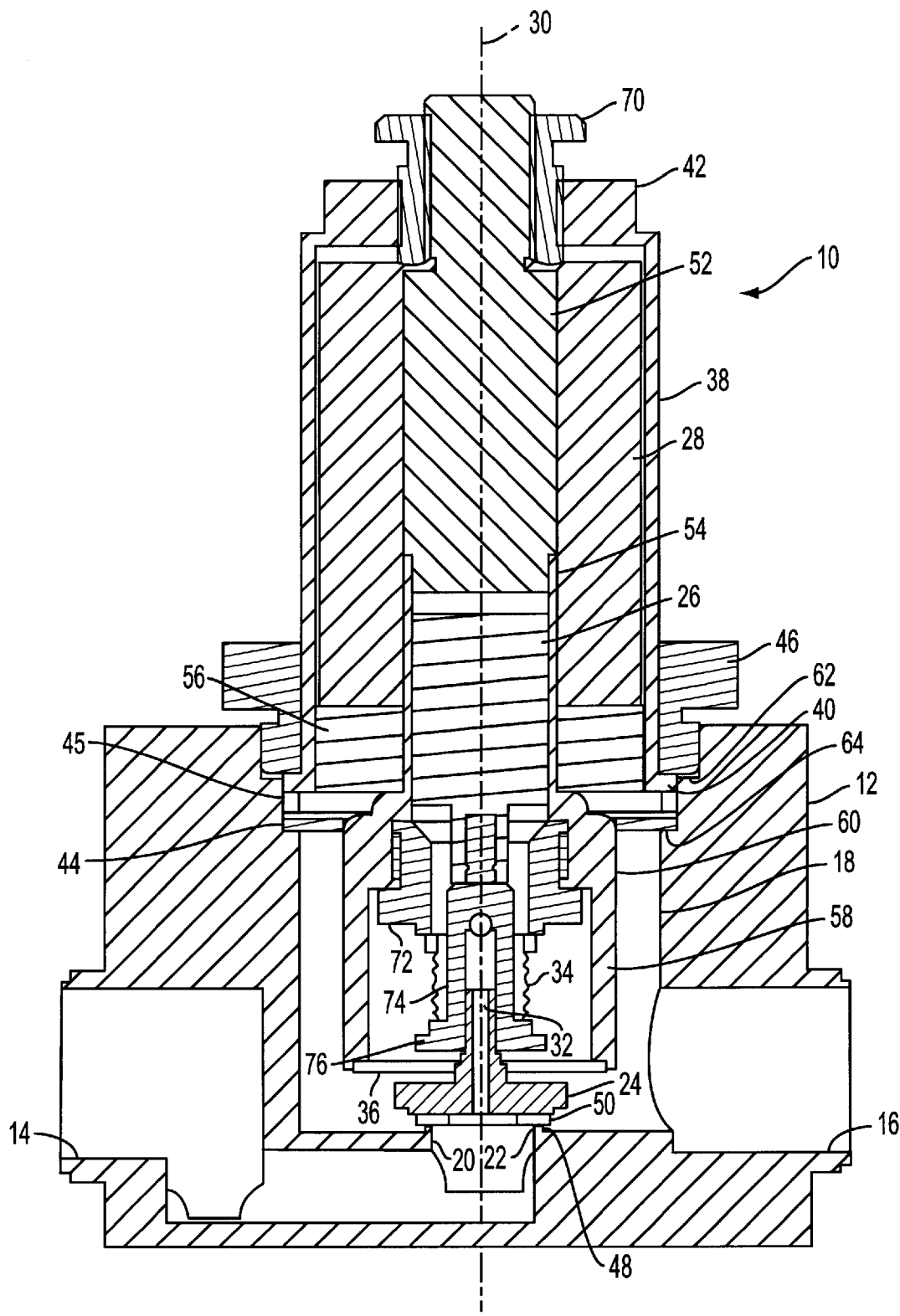
FIG. 1 is a sectional view of a valve assembly constructed in accordance with the present disclosure.

Referring to FIG. 1, the present disclosure provides a precision high flow-rate solenoid valve assembly 10, which is capable of proportional-control of large volumes of fluid in response to relatively low-power electrical control signals. The valve assembly 10 provides all the benefits of prior existing valve assemblies, yet has a simpler design including fewer components that are easier to assemble together during manufacturing.

The valve assembly 10 includes a valve body 12 having a fluid inlet port 14, a fluid outlet port 16, a bore 18 connected to one of the inlet and the outlet ports, and a valve seat 20 having a passageway 22 connecting the bore 18 to the other of the inlet and the outlet ports. In the embodiment shown, the bore 18 is connected to the outlet port 16 and the passageway 22 is connected to the inlet port 14. A valve member 24 is received in the bore 18, and an armature 26 of magnetic material is fixed to the valve member 24. An electrical solenoid winding 28 is received coaxially over the armature 26 for moving the armature 26 and the valve member 24 along an axis 30 extending through the passageway of the valve seat 20 upon the application of an electrical current to the winding 28, so that the valve member 24 opens and closes the passageway 22 of the valve seat 20 and controls fluid flow between the inlet and the outlet ports 14, 16. The seat 20, valve member 24 and the armature 26 are preferably aligned with the axis 30 along which the valve movements take place.

A pressure balancing passageway 32 connects the inlet port 14 to a sealed bellows 34, which is arranged in the valve assembly 10 to apply the high pressure of the inlet port 14 against the valve member 24, such that a minimum of force is required to move the valve member 24 along the axis 30. The valve assembly 10 also includes a spring 36 connected between the valve member 24 and the valve body 12 for returning the valve member 24 to a predetermined starting position, when the solenoid winding 28 is not energized.

The valve assembly 10 further includes a housing 38 received over the solenoid winding 28 and having an annular flange 40 for securing the housing 38 to the valve body 12. An annular seal 44 is positioned between the flange 40 of the housing 38 and the valve body 12, and a continuous collar 46 is secured to the body 12 over the housing flange thereby securing the housing 38 to the valve body 12. The collar 46 is secured to the body 12 in a continuous manner such that forces are applied evenly to the seal 44, to ensure a complete, fluid-tight seal.

In its most basic design the presently disclosed valve assembly 10 has fewer components, and which can be assembled together more easily in comparison to previously existing valve assemblies, such as the valve assembly disclosed in U.S. Pat. No. 4,796,854, or such as the valve assemblies provided in the Type 1479 and Type 1640 mass flow controllers available from MKS Instruments, Inc. of Andover, MA. Preferably, the collar 46 is continuously secured to the valve body 12 with screw threads. Alternatively, the collar 46 can be welded to the valve body 12.

As shown in FIG. 1, the valve assembly 10 is configured so that when electrical control currents are applied to the solenoid winding 28 by a suitable source, such as an output amplifier stage of a controller of a flow meter sensing an actual flow rate that is to be regulated by the valve, the armature 26 is moved away from the valve seat 20 to open the passageway 22 of the valve seat 20, and increase flow between the inlet and outlet ports 14, 16. The valve assembly 10 is further configured so that, when the solenoid winding 28 is not energized, the spring 36 moves the valve member 24 to its starting position, wherein the valve member 24 is biased against the valve seat 20 to close the passageway 22 therethrough.

Alternatively, the valve assembly 10 can be configured so that the valve seat passageway 22 is opened when the valve member 24 is at its starting position and the solenoid winding 28 is not energized. The valve assembly 10 could be further configured so that, when electrical control currents are applied to the solenoid winding 28, the armature 26 is moved towards the valve seat 20 to close the passageway 22 of the valve seat 20.

Preferably, the valve seat 20 includes a narrow rim 48, and an annular elastomeric face pad 50 is attached to the valve member 24 for mating with the rim, so that the valve member 24 can be closed in a fluid-tight sealing relation when the solenoid winding 28 is energized.

Figure 2:
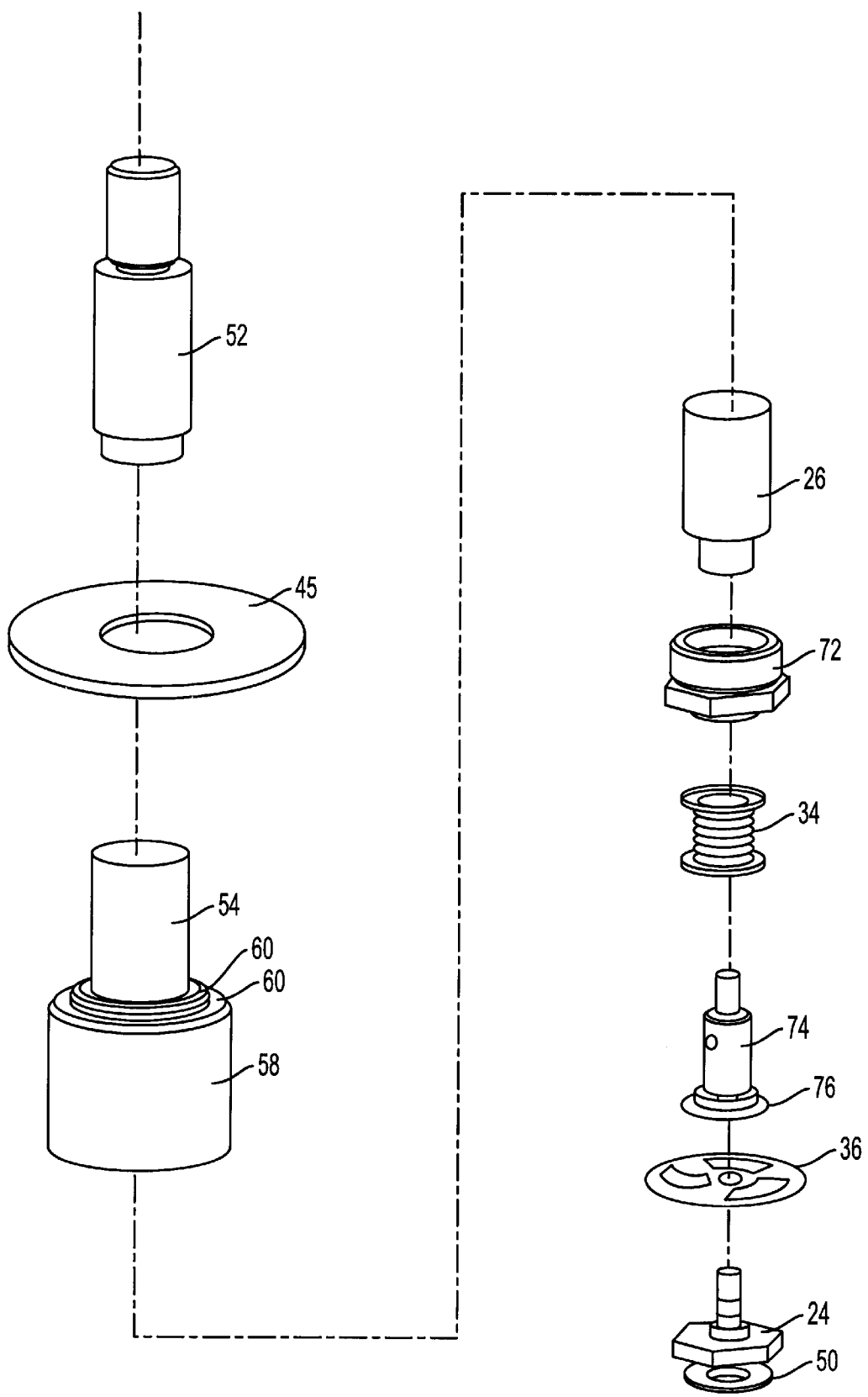
FIG. 2 is an exploded perspective view of a portion of the valve assembly of FIG. 1.
Figure 3:
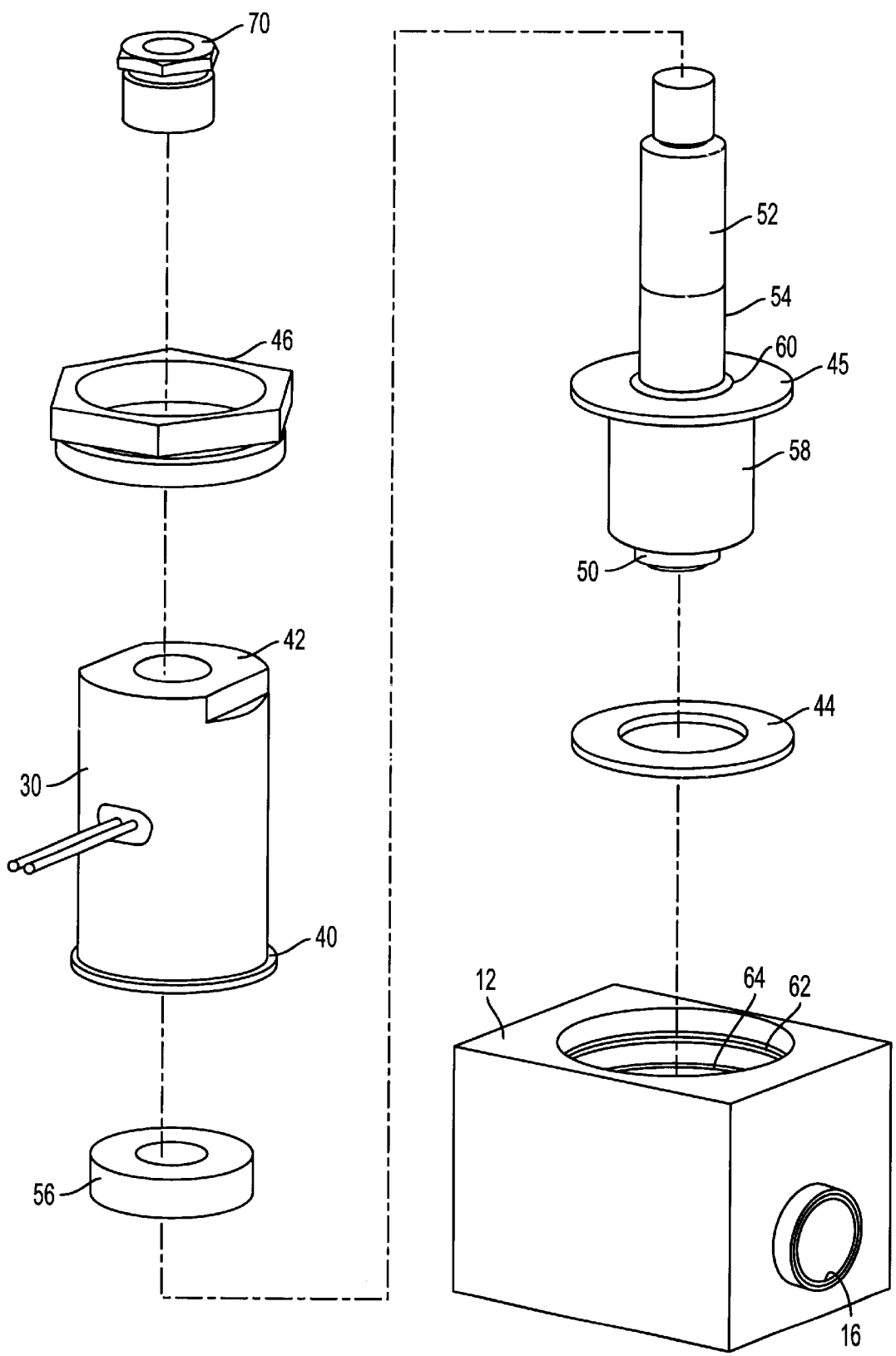
FIG. 3 is an exploded perspective view of the valve assembly of FIG. 1.

Referring to FIGS. 1 through 3, the valve assembly 10 also preferably includes a solenoid core 52 positioned in the solenoid winding 28 above the armature 26, all of which are of appropriate magnetic material. A first non-magnetic sleeve 54 is secured to the lower end of the solenoid core 52, and has a sufficiently large central axial opening to just freely accommodate movements of the armature 26 along the axis 30. An annular non-magnetic spacer 56 is positioned under the solenoid winding 28 and extends between a lower portion of an inwardly facing surface of the housing 38 and an outwardly facing surface of the first sleeve 54.

A second sleeve 58 is axially aligned with and connected to the first sleeve 54 by shoulders 60. The second sleeve 58 has a larger diameter and wall thickness than the first sleeve 54, and the shoulders 60 increase in diameter between the first and the second sleeves. Preferably, the sleeves 54, 58 and shoulders 60 are provided as a unitary piece.

As shown, the collar 46 is received in a first shelf 62 of the bore 18 of the valve body 12, while the housing flange 40 is received in a second shelf 64. The seal 44 is received between the housing flange 40 and the second shelf 64 and extends radially inwardly to the shoulders 60. The seal preferably includes a nickel gasket 44, which fits around the second sleeve 58, and a knife edge 45, which is welded to the shoulders 60. As its name implies, the knife edge 45 includes a sharpened ridge engaging the nickel gasket 44, while the second shelf 64 of the valve body 12 also includes a sharpened ridge engaging an opposite surface of the nickel gasket 44. The knife edge 45 is constructed of a suitable metal material, such as stainless steel, while the gasket 44 is preferably constructed of nickel, but can be constructed of another metal or plastic.

An annular fastener 70 adjustably secures the solenoid core 52 through an endwall 42 of the housing 38, whereby turning the fastener 70 adjusts the position of the core 52 along the axis 30, such that the starting position of the valve member 24 with respect to the valve seat 20 can also be adjusted by turning the fastener 70. An annular plug 72 is secured to an inner surface of the shoulders 60 to retain the armature 26 within the first sleeve 54, and a valve stem 74 connects the valve member 24 to the armature 26. The bellows 34 preferably extends between the annular plug 72 and a flange 76 of the valve stem 74. As shown in FIG. 1, the pressure balancing passageway 32 extends through the valve member 24 and through the valve stem 74 to communicate with the interior of the bellows 34.

The spring 36 and the bellows 34 help to center and suspend the movable valve elements in a substantially frictionless manner. The spring preferably comprises a flat spring 36 whose outer periphery is secured to an open end of the second sleeve 58 and whose inner periphery is secured to the valve member 24. The flat spring 36 has openings that allow the exterior of the bellows 34 to be exposed to the downstream pressures of the outlet port 16, while the pressure balancing passageway 32 exposes the interior of the bellows 34 to the upstream pressures of the inlet port 14.

Even though the higher upstream pressure of the inlet port 14 applies a first force to the valve member 24, the pressure balancing passageway 32 and the bellows 34 apply a counteracting second force the valve member 24. Therefore, essentially only the small centering forces of the flat spring 36 and the bellows 34 need to be overcome when the solenoid winding 28 is energized. Although the flexible bellows 34 resist stretching and compressing to some degree, the forces involved are virtually negligible, particularly where, as shown, there are many thin and axially-compliant folds or convolutions stacked together. Moreover, the bellows 34 also advantageously tend to be highly rigid radially and can therefore withstand net fluid pressures acting in those spurious directions.

It should be understood that only a very small axial motion of the valve member 24 and seat 20 clearance is required to achieve full opening of the passageway 22. Typically, a maximum span of only about fifteen thousandths of an inch of motion need occur, and that small order of displacements insures that the flat spring 36 and the bellows 34 can exert little restraint and will neither be overstressed nor add any noticeable unwanted forces.

Figure 4:
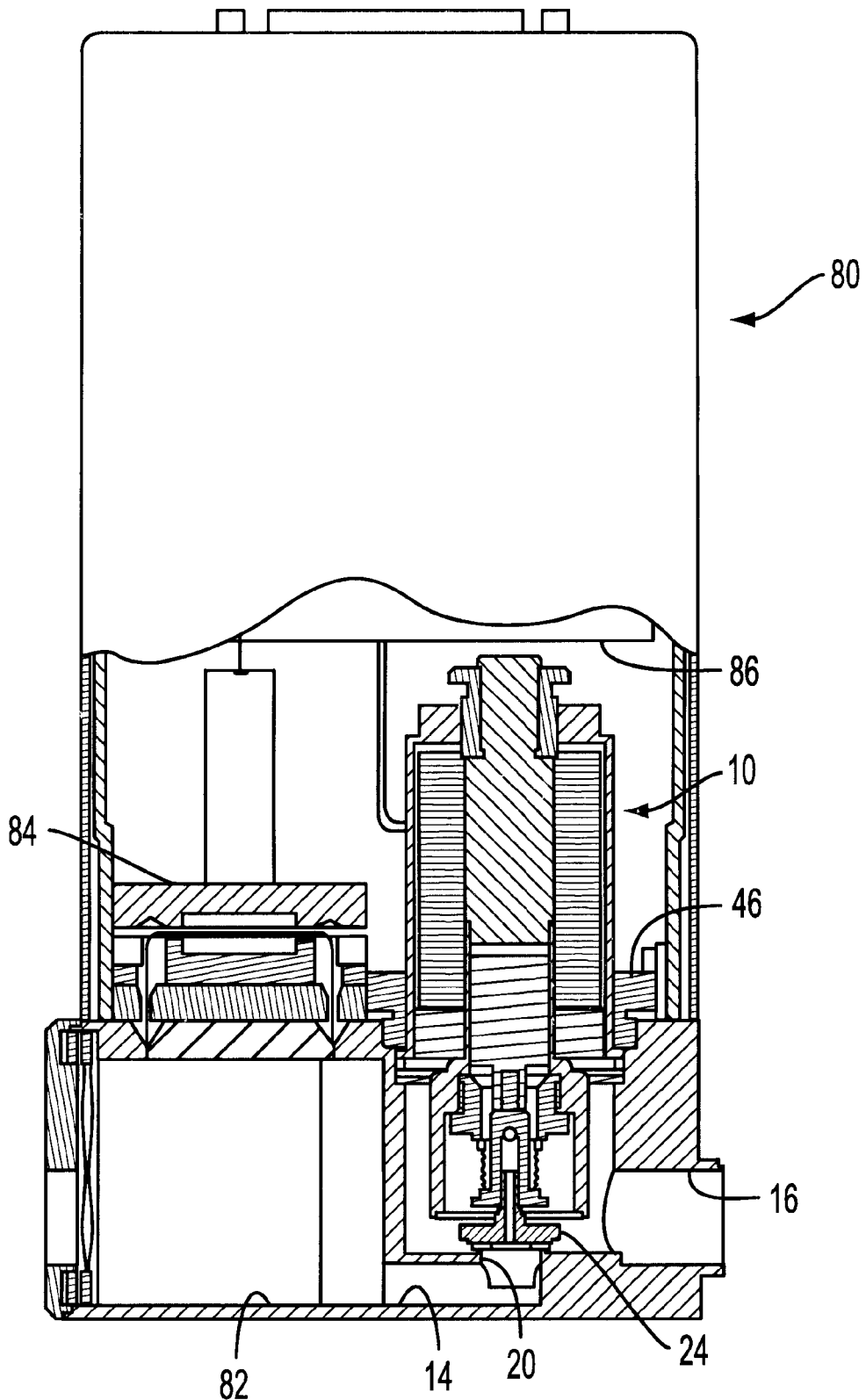
FIG. 4 is a side elevation view, partially in section, of a mass flow controller incorporating a valve assembly constructed in accordance with the present disclosure.

As an example of an application for the above-described valve, a mass flow controller 80 (MFC) incorporating the valve assembly 10 of FIGS. 1 through 3 is shown in FIG. 4. As is known, an MFC 80 is for controlling the flow rate of a gas from a source and can be used, for example, in the semiconductor manufacturing industry to precisely deliver a process vapor to a process chamber for making a semiconductor wafer. The illustrated MFC 80 happens to be a temperature-based MFC 80, but the valve assembly 10 can also be incorporated in a pressure-based MFC as well as other types of flow control devices.

The MFC 80 includes a flow path 82 connected to the inlet port 14 of the valve assembly 10, a flow sensor assembly 84 for sensing flow through the flow path, and a control device 86 programmed to receive a predetermined desired flow rate from a user, receive an indication of flow from the flow sensor assembly, and determine an actual flow rate through the flow path. The control device 86 is also programmed to instruct the valve assembly 10 to increase flow if the actual flow rate is less than the desired flow rate, and to decrease flow if the actual flow rate is greater than the desired flow rate. By "control device" it is meant herein a device or mechanism used to regulate or guide the operation of the MFC 80. The control device 86 preferably comprises a computer processing unit (CPU) including at least a processor, memory and clock mounted on a circuit board. The control device 86 operates in a feedback loop to maintain the desired flow at all times. Information on flow rate as a function of the solenoid valve assembly 10 control current is preferably stored in the control device 86 in order to quicken the response time of the MFC 80.

The embodiment and practices described in this specification have been presented by way of illustration rather than limitation, and various modifications, combinations and substitutions may be effected by those skilled in the art without departure either in spirit or scope from this disclosure in its broader aspects and as set forth in the appended claims.

What is claimed is:

1. A valve assembly comprising:
  a) a body including,
    an inlet port,
    an outlet port,
    a valve seat having a passageway connecting the inlet and the outlet ports;
  b) a valve member movable along an axis extending through the passageway of the valve seat to close and open the passageway;
  c) an armature of magnetic material fixed to the valve member;
  d) an electrical solenoid winding coaxially surrounding the armature and extending along the axis, wherein energizing the winding controls fluid flow between the inlet and the outlet ports;
  e) a fluid-tight bellows positioned to apply a force to the valve member in opposition to a force applied to the valve member by the fluid flow between the inlet and the outlet ports;
  f) a pressure balancing passageway connecting the inlet port to the bellows;
  g) a housing received over the solenoid winding and having a flange received against the valve body;
  h) a seal positioned between the flange of the housing and the valve body; and
  i) a collar secured in a continuous manner to the valve body over the housing flange, thereby securing the housing to the valve body and applying sealing forces to the seal in a substantially even manner.

2. A valve assembly according to claim 1, wherein the collar is threadedly secured to the valve body.

3. A valve assembly according to claim 1, further comprising a spring connected between the valve member and the valve body for returning the valve member to a starting position when the solenoid winding is de-energized.

4. A valve assembly according to claim 3, further comprising a sleeve connected to the valve body and coaxially positioned over the valve member with respect to the axis, and wherein the spring is connected between the sleeve and the valve member.

5. A valve assembly according to claim 4, wherein the spring comprises an annular flat spring having an outer periphery secured to the sleeve and an inner periphery secured to the valve member.

6. A valve assembly according to claim 3, wherein the starting position of the valve member comprises the valve member closing the passageway of the valve seat to prevent fluid flow between the inlet and the outlet ports.

7. A valve assembly according to claim 1, wherein the valve member is moved away from the valve seat when the solenoid winding is energized.

8. A valve assembly according to claim 1, wherein the pressure balancing passageway passes through the valve member.

9. A valve assembly according to claim 1, further comprising:
  a sleeve connected to the valve body and coaxially positioned over an exposed end of the armature with respect to the axis; and
  a valve stem connecting the valve member to the exposed end of the armature, the valve stem having a radially extending flange;
  wherein the bellows extends between the sleeve and the flange of the valve stem; and
  the pressure balancing passageway passes through the valve member and the valve stem.

10. A valve assembly according to claim 1, further comprising a solenoid core adjustably positioned along the axis within the winding between an endwall of the housing and the armature.

11. A valve assembly according to claim 10, further comprising a sleeve coaxially positioned with respect to the armature between the armature and the solenoid winding, the sleeve secure to and movable with the solenoid core.

12. A valve assembly according to claim 11, wherein the sleeve extends to adjacent the valve member, and wherein the valve assembly further comprises a spring connected between the valve member and the sleeve for returning the valve member to a starting position when the solenoid winding is de-energized, whereby adjustment of the position of the solenoid core adjusts the starting position of the valve member.

13. A valve assembly according to claim 1, wherein the seal and the flange of the housing are received on a shelf of the valve body, and the seal comprises a gasket and a knife edge, and the knife edge includes a sharpened ridge engaging the gasket, while the shelf of the valve body also includes a sharpened ridge engaging an opposite surface of the gasket.

14. A valve assembly according to claim 1, wherein the seal is metal.

15. A flow controller including a valve assembly according to claim 1, and further comprising:
   a flow path connected to the inlet port of the valve assembly;
   a flow sensor assembly for sensing flow through the flow path; and
   a control device programmed to receive a desired flow rate from a user input device, receive an indication of flow from the flow sensor assembly, determine an actual flow rate through the flow path, and instruct the valve assembly to increase flow if the actual flow rate is less than the desired flow rate, and to decrease flow if the actual flow rate is greater than the desired flow rate.

16. A valve assembly comprising:
   a valve body having fluid inlet and outlet ports, a valve seat having a passageway for connecting the ports;
   a valve member;
   substantially frictionless means suspending the valve member in the body for movements thereof along an axis toward and away from the seat in nearby positions where fluid pressure differences appear across the valve member and create first net forces tending to move the valve member in one direction along the axis;
   solenoid control assembly for moving and setting the position of the valve member along the axis to govern flow of fluid between the ports through the seat passageway;
   a bellows connected fluid-tight between the valve member and the valve body and allowing substantially frictionless relative movement therebetween along the axis;
   a pressure balancing passageway exposing the bellows to pressures at the inlet port, whereby the valve member is subjected to second net forces along the axis which are related to differences in pressures at the inlet and outlet and which are of substantially the same magnitude as the first net forces and in a direction opposite thereto;
   a housing received over the solenoid control assembly and having a flange received against the valve body; and
   a collar secured in a continuous manner to the valve body over the housing flange, thereby securing the housing to the valve body in a substantially even manner.

17. A valve assembly according to claim 16, wherein the collar is threadedly secured to the valve body.

18. A valve assembly according to claim 16, further comprising a seal positioned between the flange of the housing and the valve body.

19. A valve assembly according to claim 18, wherein the seal comprises a knife edge and a gasket, and the knife edge includes a sharpened ridge engaging the gasket.

20. A flow controller including a valve assembly according to claim 16, and further comprising:
   a flow path connected to the inlet port of the valve assembly;
   a flow sensor assembly for sensing flow through the flow path; and
   a control device programmed to receive a desired flow rate from a user input device, receive an indication of flow from the flow sensor assembly, determine an actual flow rate through the flow path, and instruct the valve assembly to increase flow if the actual flow rate is less than the desired flow rate, and to decrease flow if the actual flow rate is greater than the desired flow rate.

* * * * *